March 6, 1934.   G. SALMONS ET AL   1,950,271
HOOD FITTING FOR MOTOR AND OTHER VEHICLES
Filed Feb. 20, 1933

INVENTORS
George Salmons
Arthur H. Dalby-Balls
By
ATTORNEY

Patented Mar. 6, 1934

1,950,271

UNITED STATES PATENT OFFICE 1,950,271

HOOD FITTING FOR MOTOR AND OTHER VEHICLES

George Salmons and Arthur Henry Dalby-Balls, Newport Pagnell, England; said Dalby-Balls assignor to Arthur James Lucas Salmons, Newport Pagnell, England Application February 20, 1933, Serial No. 657,718
In Great Britain February 23, 1932

1 Claim. (Cl. 296—112)

This invention relates to the invention set forth in the specification and drawing of United States Patent No. 1,674,573 of 19th June 1928, and has for its object to provide an improvement in or a modification of such invention.

In such invention set forth in Patent No. 1,674,573, we construct mechanism for raising and lowering the hood of motor and other vehicles by means of a crank handle and comprising two sets of fittings, each set consisting of a gear wheel pivotally carrying a rod hinged to the rear pillar fitting, an extension on the rear cant rail pivoted to the rear pillar fitting, an extension on the upper end of the rear pillar fitting, a rocking lever pivotally mounted thereto, a link pivoted to the rear cant rail extension and the rocking lever, a rod pivoted to the upper end of the rocking lever and one of a series of rods pivoted together and to the cant rails, a shaft positioned across the back of the vehicle for engagement and operation by a crank handle and geared connections or drives from the shaft to each gear wheel carrying the rod connecting the back pillar, a telescopic tube carrying a spring, connecting two rocking levers pivoted to a frame one being connected by a rod to the rear pillar fitting and the other by a link to the centre pillar fitting and a telescopic tube carrying a spring connecting an extension on the rear cant rail fitting and a rod pivoted to said cant rail, said rod being actuated through the rocking lever on the rear pillar fitting.

This present invention relates to the gearing actuated by the crank handle and appliances connecting the gearing with the rear pillar fitting whereby a greater ease of movement is obtained in the raising and lowering of the hood, the other parts of the mechanism remaining the same, and the actuating gear can be positioned at a greater or any distance from the rear folding pillar fitting and whereby the actuating gear is so positioned that the winding key can be inserted at next the extreme rear of a body having a somewhat greater length from behind the rear pillar fitting instead of in the middle as would be the case with the previous invention and improvement with such class of vehicles.

According to an improvement in or modification of the gears and appliances for raising and lowering the hood as set forth in the specification of British Patent No. 370,324 which was not the subject of a patent in the United States, instead of connecting the rear pillar fitting by a rod pivoted thereto, and to a plate on one of the gear wheels as in 1,674,573, we employed a toothed quadrant which may form part of or be attached to the rear pillar fitting, such toothed quadrant meshing with a gear wheel forming one of a series connecting the gear wheel on the shaft and actuated by a crank handle.

Now according to the present improvement in or modification of the gearing set forth in the specification and drawings of the United States Patent No. 1,674,573, instead of connecting the toothed quadrant to the rear pillar fitting as mentioned above, we mount the toothed quadrant on a separate stub axle to that carrying the rear pillar fitting, and we extend the rear pillar fitting beyond its stub axle and connect same to the quadrant by a link pivotally connected to each, and such link may be of a fixed length to suit the vehicle or made telescopic or adjustable as to length to suit various vehicles having different lengths of bodies between the rear pillar fitting and the back edge.

The invention will be clearly understood from the following description aided by the annexed drawing in which.

Figure 2:
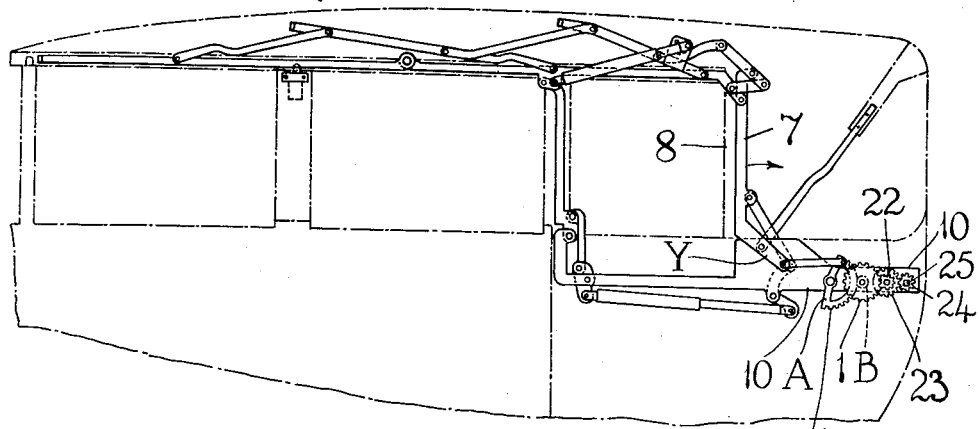
Figure 2 is a side elevation of one set of complete fittings and our improved operation gear showing their position when the hood is closed, the body and hood being shown in broken lines.
Figure 3:
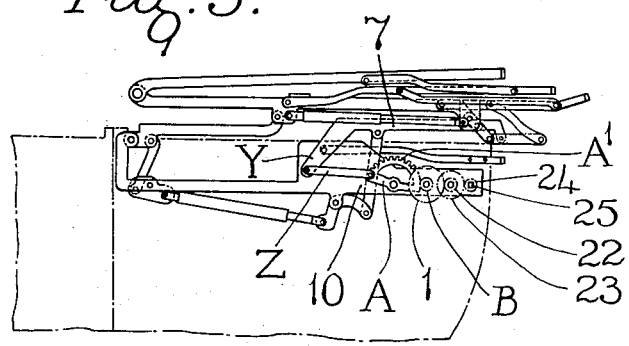
Figure 3 is a side elevation of the fittings shown in Figure 2 in position when the hood is opened.
Figure 1:
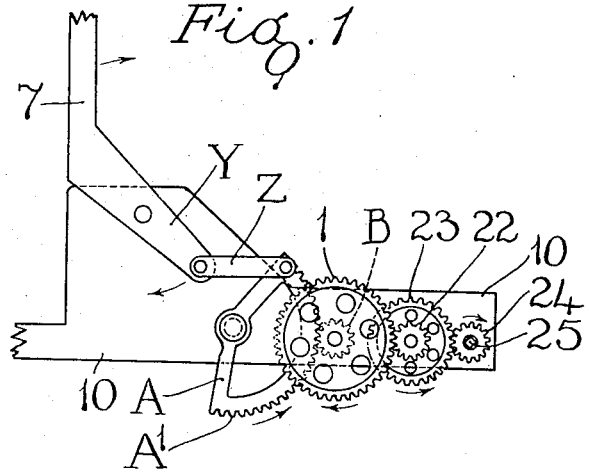
Figure 1 is a side elevation of our improved gear in the position when the hood is in a closed condition.

According to the present invention or improvement, we extend the rear pillar fitting 7 at Y beyond its pivotal point and we pivot the toothed quadrant A on the bearing plate 10, and we pivotally connect the quadrant A to the extension Y by a link Z, the link being of any suitable length to suit the make of vehicle body, or such link may be telescopic or adjustable in length to suit any length of body between the rear pillar fitting 7 and the back. The quadrant A has teeth $A^1$ on its outer edge, and such teeth $A^1$ mesh with a pinion B mounted on the gear wheel 1, and such gear wheel 1 meshes with a pinion 22 mounted on a gear wheel 23 which in turn meshes with a pinion 24 mounted on the shaft 25 which is operable by the crank handle as before.

The gearing is mounted on stub axles secured to the bearing plate 10 secured to the vehicle body at below and behind the rear pillar 8.

What we do claim as our invention and desire to obtain by Letters Patent is:—

A hood fitting for motor and other vehicles, including a plate for attachment to a side of the body of a vehicle, a rear top-supporting pillar pivoted to said plate and having an extension projecting downwardly beyond its pivot, a quadrant mounted on said plate for rotation about an axis located rearwardly of and below the lower end of said extension, a single link connected to said extension and quadrant, said link being pivoted directly to the lower end of said extension and directly to said quadrant at a point above the axis of the latter, said link being operative by the rotation of said quadrant in one direction to move said top-supporting pillar into a substantially vertical position and by rotation of said quadrant in the opposite direction to move said pillar into a substantially horizontal position, and means for rotating said quadrant.

GEORGE SALMONS.
ARTHUR HENRY DALBY-BALLS.